(12) United States Patent
Aleksandersen et al.

(10) Patent No.: US 7,878,221 B2
(45) Date of Patent: Feb. 1, 2011

(54) SMARTPLUG WITH WHEEL CENTRALIZER

(75) Inventors: Jostein Aleksandersen, Randaberg (NO); Harald Syse, Røyneberg (NO)

(73) Assignee: TDW Offshore Services AS, Stavanger (NO)

( * ) Notice: Subject to any disclaimer, the term of this patent is extended or adjusted under 35 U.S.C. 154(b) by 226 days.

(21) Appl. No.: 12/296,635

(22) PCT Filed: Apr. 12, 2007

(86) PCT No.: PCT/NO2007/000131

§ 371 (c)(1),
(2), (4) Date: Oct. 23, 2008

(87) PCT Pub. No.: WO2007/117154

PCT Pub. Date: Oct. 18, 2007

(65) Prior Publication Data

US 2009/0272451 A1   Nov. 5, 2009

(30) Foreign Application Priority Data

Apr. 12, 2006   (NO) .................................. 20061669

(51) Int. Cl.
*F16L 55/16*   (2006.01)

(52) U.S. Cl. ........................... 138/98; 138/90; 166/122; 166/135

(58) Field of Classification Search .................. 138/89, 138/90, 97; 166/122, 135, 134
See application file for complete search history.

(56) References Cited

U.S. PATENT DOCUMENTS

| 1,717,986 | A | | 6/1929 | Liebau | |
|---|---|---|---|---|---|
| 3,058,137 | A | | 10/1962 | Doyle et al. | |
| 4,057,081 | A | * | 11/1977 | Jones | 138/97 |
| 4,332,277 | A | | 6/1982 | Adkins et al. | |
| 4,465,104 | A | * | 8/1984 | Wittman et al. | 138/89 |
| 4,498,811 | A | * | 2/1985 | Fern et al. | 405/168.1 |
| 4,991,651 | A | * | 2/1991 | Campbell | 166/122 |
| 5,293,905 | A | * | 3/1994 | Friedrich | 138/89 |
| 5,924,454 | A | * | 7/1999 | Dyck et al. | 138/89 |
| 6,129,118 | A | * | 10/2000 | Friedrich et al. | 138/89 |

FOREIGN PATENT DOCUMENTS

| GB | 2255814 | 11/1992 |
|---|---|---|
| WO | WO 03/067134 | 8/2003 |

OTHER PUBLICATIONS

European Patent Office, "International Preliminary Report On Patentability," (Apr. 29, 2008).

* cited by examiner

*Primary Examiner*—Patrick F Brinson
(74) *Attorney, Agent, or Firm*—Gable Gotwals

(57) ABSTRACT

The invention regards a device for movement within a pipeline which device comprises at least one centralizing means (20) comprising at least two centralizing elements (21) arranged around the circumference of a body (8) of the device. The centralizing elements (21) are arranged to move from a retracted position to an extended position in contact with an inner wall (2) of a pipeline (1) to centralize the device.

13 Claims, 2 Drawing Sheets

SMARTPLUG WITH WHEEL CENTRALIZER

CROSS-REFERENCE TO PENDING APPLICATIONS

Figure 1:
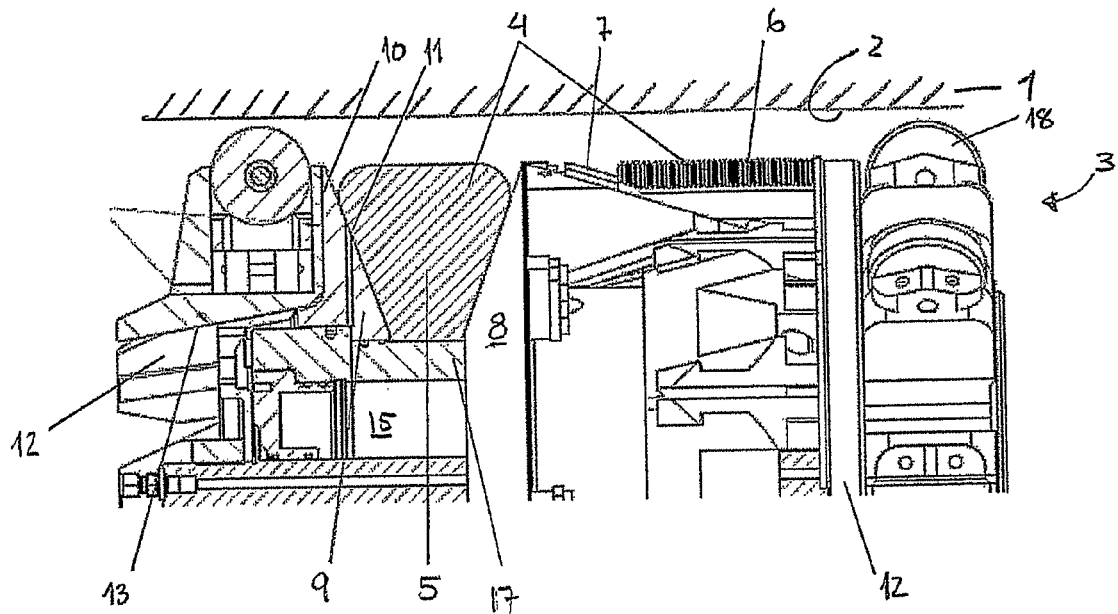

This application is based on PCT Patent Application No. NO2007/000131, filed on Apr. 12, 2007, which was based on Norwegian Patent Application No. 20061669, filed Apr. 12, 2006.

The present invention regards a system for centralizing a device which is movable within a pipeline, for instance a plug for temporarily sealing off the pipeline.

Normally a temporarily set plug will be pigged into the pipeline to the set location of the plug. At set location sealing and gripping means of the plugs are activated to make a sealed connection with an inner wall of the pipeline. It is important to centralize the plug at set location when the plug should be set, to provide a good connection between plug and pipeline. To achieve this normal plugs are provided with centralizing means, normally in the form of wheels arranged around the circumference of the plug. These wheels are pre-tensioned to always be in contact with the inner wall of the pipeline during movement of the plug through the pipeline, and thereby centralize the plug through the whole pigging and setting procedure before the plug is set. Also other devices moved through the pipeline have centralizing means in constant contact with the inner wall of the pipeline, as measuring devices, cleaning pigs etc. One example of this is the inspection pig described in GB 2255814, which has two modus of operation, wherein the first modus operandi the centralizing means are in contact with the wall of the pipeline and in the second modus operandi there is in addition to the centralizing means moved a set of anchoring means into contact with the wall. However, the centralizing means will always be in contact with the wall of the pipeline. Also in U.S. Pat. No. 3,058,137 and U.S. Pat. No. 1,717,986 there is described apparatuses for treating the internal of a pipeline, which apparatuses both have centralizing wheel which are described to always be in contact the internal wall of the pipeline.

To have these wheels or other means for centralizing the plug within the pipeline, always in contact with the wall may in some cases not be favorable. First having the centralizing means always in contact with the pipeline wall, causes friction in this contact, this will increase the amount of energy needed to pig the plug through the pipeline. This is especially an issue when the pipeline becomes longer. Another element is that the pipeline may comprise parts with smaller inner diameters making the passage of the plug with the centralizing wheels difficult, if not impossible.

An aim with the present invention is to minimize or alleviate the problems associated with prior known solutions, as mentioned above. Another aim is to achieve a device with centralizing means which may be used when needed. It is also an aim to provide a plug with a good system for centralizing the plug at set location. It is in addition an aim to provide a plug were one achieves this without additional actuation systems within the plug.

These aims are achieved with a device according to the invention as defined in the following claims.

The invention regards a device for movements through a pipeline. This device may be a pig, a plug or other elements that should be moved through the pipeline.

In a preferred embodiment of the invention the device is a plug for temporarily sealing off a pipeline. The invention is however not limited to plugs. By sealing off a pipeline, one should understand; divide two parts of the pipeline with the plug as a barrier between these parts. These two parts of the pipeline may when the plug is set have different pressures in the fluid within the pipeline. A plug may also be used to seal off an end of a pipeline from the surroundings. Another possibility is to have a plug which seal against an inner wall of a pipeline, where there are means for providing a flow of fluid through the plug.

The plug comprises a plug body with extendable and retractable sealing means around the circumference of the plug body, for interaction with an inner wall of the pipeline to create the barrier when the plug is set within the pipeline. There is in an embodiment both sealing and gripping means and these may be common or separate means, operated by a common or separated actuation means. In one embodiment the sealing and gripping means are operate by a common actuation means, positioned centrally within the plug body.

The device according to the invention, or the plug also, comprises at least one centralizing means comprising at least two centralizing elements arranged around a circumference of the body or the plug body in the case with a plug. This circumference may be an outer circumference of the plug body or a part of the plug body which has an outer circumference with a smaller diameter than an outer circumference for the whole plug body.

According to the invention the centralizing elements are arranged to be moved from a retracted position out of contact with the pipeline wall to an extended position in contact with an inner wall of a pipeline to centralize the device within the pipeline at desired locations or the plug at set location for the plug. This system gives that the centralizing means are retracted during pigging or other kind of movement of the device or plug within the pipeline and will be extended to centralized the device or plug within the pipeline at the site where it is necessary to centralize the device or for the plug at the set location for the plug, reducing friction between device or plug and pipeline during movement and also minimizing the problems with obstructions within the pipeline as reduced diameter or debris etc. There may favorably be more than two centralizing elements around the circumference of the body to give a good centralization of the device or plug.

The invention is further explained in relation to a plug, but it should be understood that several features may be equally useable on devices for traveling through a pipe that isn't a plug, for instance a pig or train of elements moved through the pipeline.

According to an aspect of the invention a centralizing element of the centralizing means, comprises an angled inner surface abutting an outer angled surface of the plug body or body of the device, and a surface arranged in a mainly radial direction, abutting a corresponding surface of the plug body, which two plug body surfaces are arranged on different plug body elements, which are moved relative each other in an axial direction to move the centralizing elements between a retracted and an extended position. The outer angled surface of the plug body may form a mainly truncated conical surface, going from a smaller diameter to a larger diameter, where the centralizing element when it is close to the smaller diameter is in a retracted position and when it is close to the larger diameter is in an extended position. The surface arranged in a mainly radial direction, may be radial but may also have an angle other than zero with a radial direction. The issue is to have the surface extending between a point with a radius to a point with a larger radius. The direction of the angled surfaces and the surfaces extending in the radial direction determines the movement of the centralizing element, and a change in the angle of the angled surface may change the speed of how fast the centralizing element is moved to an extended position. The angled surfaces may also be formed with a stepped surface or there may be other arrangements for moving the centralizing means to an extended position as described in the applicants' own NO patent 316 740 and NO application 20051478. The movement of the centralizing means is achieved with a relative movement between the plug body elements.

The centralizing elements comprises in at least one of the surfaces, interacting means locking the centralizing elements to the corresponding surface of the plug body in one direction and thereby also guide the elements during relative movement between them. When talking about locking in this aspect it should be understood locked in the movement away from each other but allowing movement of the elements in at least one direction mainly parallel with the plane of the surfaces. These interaction means may be in the form of protrusions and grooves respectively on each of the elements, where the protrusion/groove may be T-shaped, but may have other forms.

According to another aspect the centralizing means are moved from a retracted position to an extended position by a movement means, which movement means also may operate the movement of the sealing and gripping means of the plug. The movement means is preferably a centrally located fluid operated cylinder, where the piston head of the fluid operated cylinder is attached to one of the plug body elements acting on the centralizing means and a cylinder housing of the fluid operated cylinder is attached to another plug body element. This gives a very compact plug with only one fluid operated element, which is favorable with regards to reliability and operation of the plug.

According to another aspect one of the invention the two plug body elements acting on the centralizing means may be a second plug body element forming an end plate of the plug, which plug body element comprises the radial surface abutting the centralizing means on one side and a surface abutting a packer of the sealing and gripping means on the opposite side seen in an axial direction of the plug. This end plate will normally see the high pressure side of the plug after setting of the plug. This second plug body element may be connected with the cylinder housing of the fluid operated cylinder and a first plug body element comprising the angled surface may be connected to the piston head of the fluid operated cylinder forming the other of the two plug body elements acting on the centralizing means, or opposite. By having the centralizing elements connected to the same fluid operated cylinder as the sealing and gripping means and arrangement of the gliding surfaces between the different elements of the plug body and centralizing elements one may achieve a setting procedure of the plug where the centralizing means first are coming in contact with the inner pipeline wall thereafter or simultaneously the gripping and sealing means of the plug.

According to an aspect of the invention the centralizing element comprises a body and a support element mounted movable in a radial direction relative the body with an elastic element between the body and the support element. The body will comprise the angled and radial surface abutting the plug body, and the elastic element may be a spring element, a packer or similar. According to another aspect the support element may be block, belt or a wheel. If rotational, they are mounted with a rotational axis transverse to an axial and radial direction of the plug.

According to an aspect of the invention the sealing and gripping means of the plug comprises an annular packer and slips movable on a truncated coned surface formed by a third body element, where the centralizing means are arranged on the opposite side of the packer relative the slips. The slips and coned surface of the plug body are arranged to be self-locking with a differential pressure across the plug, and the packer is normally positioned closer to a high pressure side of the plug when the plug is set in the pipeline and the pressure is released on one side of the plug. According to another aspect of the invention the plug may be formed without gripping means in the form of slips, and instead have centralizing means on both sides of the sealing means, or even just one circumferential sealing means in the form of a packer and one centralizing means. The centralizing means may also be positioned on the plug in several positions, as for instance one between the slips and the packer or other places.

In an aspect there may be two or more centralizing means arranged on the plug.

Figure 2:
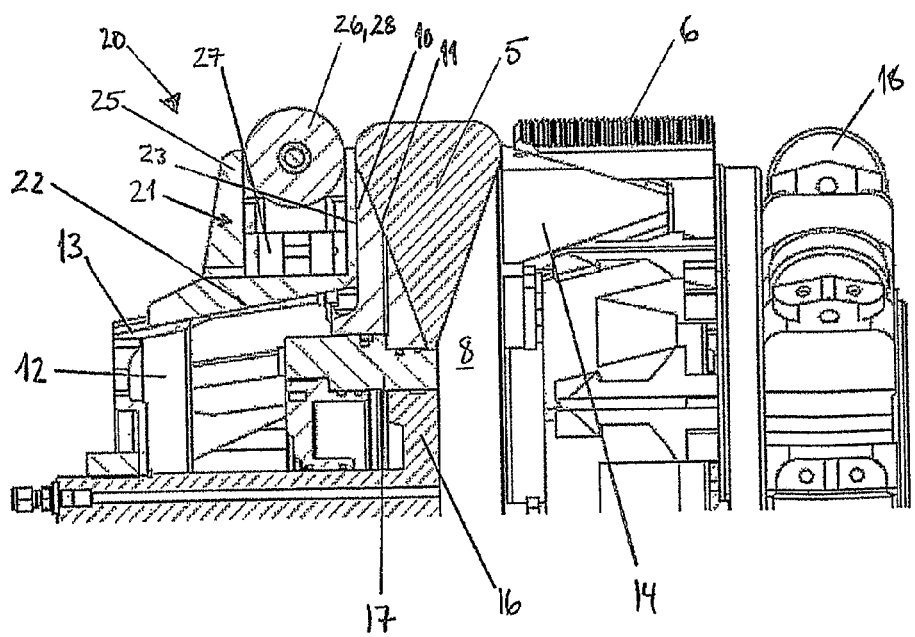
Figure 3:
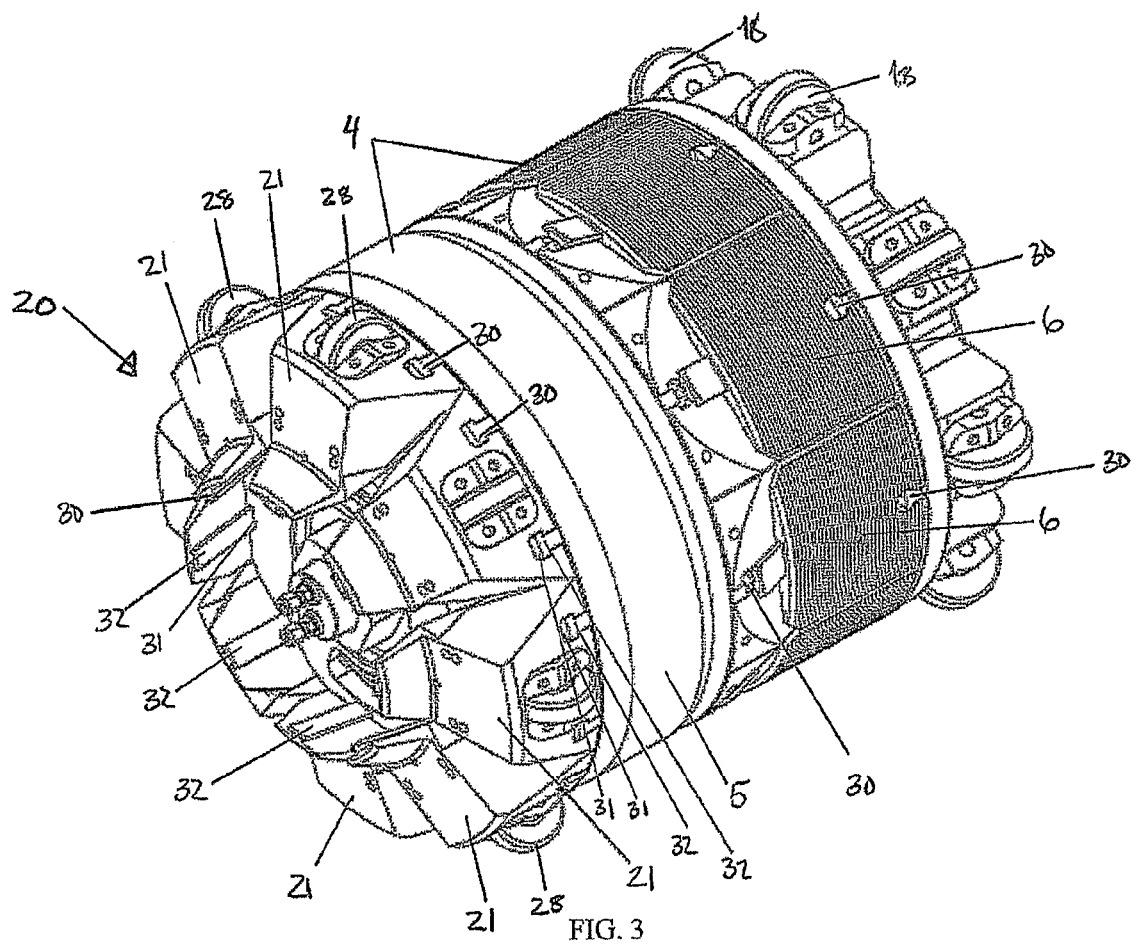

The invention will now be explained with a non-limiting embodiment with reference to the accompanied drawings, where;

FIG. 1 is a partial cross section through a part of a plug in an unset position within a pipeline, FIG. 2 is a partial cross section of the plug in FIG. 1 in a set position, and FIG. 3 is an elevated sketch of a plug.

In the figures there is shown one type of plug with a type of gripping and sealing means, and actuation means for actuating these. The features of the invention will work with other kind of gripping and sealing means and actuation means and even with a device without sealing and gripping means or just sealing means.

In FIGS. 1 and 2 there is shown partial cross section of approximately half a plug 3. In FIG. 1 the plug 3 is shown within a pipeline 1 with an internal wall 2 of the pipeline. The plug 3 shown in this embodiment comprises sealing and gripping means 4 comprising of an annular packer 5 and slips 6 moved in a radial direction by being moved in an axial direction relative a bowl surface 7 formed on a plug body 8. The plug body 8 comprises in this embodiment three body elements, a first plug body element 9 a second plug body element 12 and a third plug body element 14. The first plug body element 9 forms an endplate surface of the plug, and the second plug body element 12 forms an endplate surface, at the opposite end of the plug 3.

The first plug body element 9 comprises an annular shaped radial surface 10 and the second plug body element 12 comprises an angled surface 13. The radial surface 10 and angled surface 13 abut surfaces of the centralizing means 20, comprising of centralizing element 21, where there are indicated eight in FIG. 3. As can bee seen in FIG. 2, the centralizing element 21 comprises an angled inner surface 22 abutting the angled surface 13 of the second plug body element 12, and a radial arranged surface 23 abutting the radial surface 10 of the first plug body element 9. The surfaces of the centralizing element 21 and the first and second plug body element respectively are moveable relative each other in a direction parallel with the surfaces. The centralizing element 21 is locked to the first and second plug body elements 9,12 by interacting means 30, in the form of T-shaped grooves 31 and corresponding T-shaped protrusions 32 in the abutting surfaces, as indicated in FIG. 3 for the radial arranged surface 23 and radial surface 10. The interacting means 30 will lock the centralizing element 21 from moving away from the first plug body element 9, and guide and limits the movement of the two elements 9, 21 to one direction in the plane of the abutting surfaces 10, 23.

The centralizing element 21 comprises as can be seen from FIG. 2 of a support element 26, arranged radial outermost, for interaction with the inner wall of the pipeline, a elastic element 27 and a body 25. The body 25 comprises the angled inner surface 22 and the radial arranged surface 23. The elastic element is arranged between the body 25 and the support element 26, pressing the support element outwards, and giving some elasticity in the interaction between the support element 26 and the inner pipeline wall. The support element may be a wheel 28, with a rotational axis transverse to a radial and axial direction of the plug 3. The plug may also as shown comprise guide wheels 18 on the opposite end of the plug relative the centralizing means. These guide wheels 18 may be set in one position or be movable between a retracted and extended position and thereby form a second set of centralizing means according to the invention.

The plug further comprises an actuation means or movement means 15 in the form of a hydraulic cylinder with a piston head 16 arranged within a cylinder housing 17. Movement of the piston head 16 relative the cylinder housing 17 will move the centralizing means 20 and the sealing and gripping means 4 between a retracted position as shown in FIG. 1 and an extended position as shown in FIG. 2 (not shown within a pipeline). In the extended position, at set position of the plug, the packer 5 will be pressed between two surfaces of the plug body 8 and thereby be pressed radial outwards. One of these surfaces, a pressing surface 11 is formed by the first plug body element 9 facing an opposite direction compared with the radial surface 10. The opposite surface pressing the packer 5 is formed by the third plug body element 14 also comprising the bowl surface 7 abutting an inner surface of the slips 6.

The plug as shown will be set at the desired location in the pipeline for sealing between two sections of a pipeline. When the plug has reached this desired location the movements of the plug through the pipeline is stopped, by for instance stopping the pigging of the plug. At this location the setting procedure is actuated in a known manner, by actuating the fluid operated cylinder within the plug. This cylinder will move the endplate surfaces toward each other and thereby extend the centralizing means to centralize the plug. Simultaneously but with a slower radial movement the slips are extended, reaching contact with the pipeline wall after the centralizing means. This movement of the endplate surfaces will also press the packer together into sealing contact with the pipeline wall. The plug is now set within the pipeline, and the pressure of the fluid within the pipeline may be released on one side of the plug. Since the plug is a self locking plug the end plate surfaces will tend to move further toward each other, and the centralizing means will follow this movement and move in an axial direction relative the pipeline wall in a set configuration of the plug. In other circumstances with different configurations of the centralizing means and sealing means the centralizing means may not move relative the pipeline wall in a set state of a plug. One may also have configurations where one centralizing means are moving and another centralizing means is not moving relative the pipeline wall in a set state of the plug.

The invention has now been explained with a preferred embodiment. A skilled person will understand that there may be made modifications and alternations to the described embodiment within the scope of the invention as defined in the following claims. One will understand that for a heavier device moved through the pipeline, some of the support elements will be in contact with the inner wall of the pipeline also in a retracted position, due to the weight of the device. The centralizing device may be used during a part of a movement through the pipeline when it is important to centralize the device but be retracted through other parts of the run through the pipeline. The device may be moved through the pipeline by other means than pigging, for instance moved by a pipeline tractor, of combination of pigging and pipeline tractor.

The invention claimed is:

1. A plug for temporarily sealing off a pipeline with an inner wall, said plug comprising:
  an extendable and retractable gripping and sealing means for interaction with the inner wall of the pipeline and said gripping and sealing means having at least one centralizing means with at least two centralizing elements arranged around a circumference of a plug body of said plug, said gripping and sealing means arranged to move between a retracted position out of contact with the inner wall and an extended position in contact with the inner wall wherein each said centralizing element having a support element for rotary interaction with the inner wall, a body for holding the support element and an elastic element between said body and said support element, whereby the support element is movable in a radial direction relative said body.

2. The plug according to claim 1, said plug body comprising at least a first plug body element and a second plug body element and where the centralizing elements are movable between the retracted and the extended positions by movement of said first body element relative to said second plug body element.

3. A plug for temporarily sealing off a pipeline with an inner wall, said plug comprising:
  an extendable and retractable gripping and sealing means for interaction with the inner wall of the pipeline and said gripping and sealing means having at least one centralizing means with at least two centralizing elements arranged around a circumference of a plug body of said plug, said gripping and sealing means arranged to move between a retracted position out of contact with the inner wall and an extended position in contact with the inner wall wherein each said centralizing element having a support element for rotary interaction with the inner wall;
  wherein the centralizing element has an angled inner surface abutting an outer angled surface of said body, and a surface arranged in a mainly radial direction, abutting a corresponding surface of said body, which two said body surfaces are arranged on different body elements, which are moved relative to each other in an axial direction to move said centralizing elements between said retracted and extended positions.

4. The plug according to claim 3, further comprising at least one of said surfaces of said centralizing elements and a corresponding body surface with an interacting means locking said elements together and guiding said elements during relative movement between them.

5. A plug for temporarily sealing off a pipeline with an inner wall, said plug comprising:
  an extendable and retractable gripping and sealing means for interaction with the inner wall of the pipeline and said gripping and sealing means having at least one centralizing means with at least two centralizing elements arranged around a circumference of a plug body of said plug, said gripping and sealing means arranged to move between a retracted position out of contact with the inner wall and an extended position in contact with the inner wall wherein each said centralizing element having a support element for rotary interaction with the inner wall;
  whereby said centralizing means are moveable from a retracted position to an extended position by a movement means, said movement means also operate the movement of the sealing and gripping means of the device.

6. The plug according to claim 4, said movement means comprising a centrally located fluid operated cylinder, where a piston head of said fluid operated cylinder is attached to one of said plug body elements acting on said centralizing means and a cylinder housing of the fluid operated cylinder is attached to another plug body element.

7. The plug according to claim 6, wherein a first plug body element forms an end plate of the plug comprising the radial surface abutting the centralizing means on one side and a surface abutting a packer of the sealing and gripping means on the opposite side, seen in an axial direction, which first plug body element is connected to the cylinder housing of the fluid operated cylinder and a second plug body element comprising the angled surface is connected to the piston head of the fluid operated cylinder.

8. The plug according to claim 1, said support element comprising a wheel mounted with a rotational axis transverse to an axial and radial direction of the plug.

9. The plug according to claim 1, said sealing and gripping means comprising an annular packer and slips movable on a coned surface formed by a third body element, where said centralizing means are arranged on opposing sides of said packer relative to said slips.

10. The plug according to claim 1, further comprising at least two centralizing means arranged on said plug.

11. The plug according to claim 1, further comprising said centralizing means arranged at a high pressure side of said gripping and sealing means.

12. A method of setting a plug according said method comprising:
- placing the plug at a desired location in a pipeline having an inner wall;
- activating an actuation means in the plug so as to move two or more plug body elements towards each other, whereby a gripping and sealing means and a centralizing means are displaced in a radial direction relative to the plug;
- extending the centralizing means into engagement with the pipeline inner wall;
- extending a slip with a slower radial movement than that of the centralizing means, into engagement with the pipeline inner wall; and
- extending a packer into engagement with the pipeline inner wall whereby the slip reaches contact with the pipeline inner wall after the centralizing means reaches contact with the pipeline inner wall.

13. The method according to claim 12, further comprising moving the centralizing means in an axial direction relative to the pipeline wall when the plug is set in the pipeline.

* * * * *